Patented Mar. 30, 1943

2,315,466

UNITED STATES PATENT OFFICE 2,315,466

WELDING ROD

Joseph J. Vetter, Hackensack, N. J., assignor to Natural Products Refining Co., Jersey City, N. J., a corporation of Delaware No Drawing. Application March 5, 1942, Serial No. 433,444

2 Claims. (Cl. 219—8)

My invention relates particularly to a new kind of welding rod, the process of applying the same in the surfacing of steel and the surfaced steel obtained thereby.

The object of my invention is to provide a new and superior welding rod which has many advantages in applying wear surfaces to steel therewith and to obtain surfaced steel thereby of a more desirable character, for example having a greater hardness and length of wear. Another object is to provide welding rods containing high percentages of chromium, carbon and silicon. A further object is to provide welding rods which can be used in the place of previous hard surfacing rods now in use and which will produce harder surfaces having a longer life than those previously obtainable. A further object is to provide rods which can be used in welding for producing the said surfaces on steel without the necessity of employing a flux. Another object is to produce steel surfaced in this way, having an extraordinarily hard wear-resistant surface. Furthermore, it is found that by controlling the temperature in the welding operation the amount of the carbon remaining in the surface thus produced on the steel can be effectively controlled. In this way, surfaces containing less carbon and, therefore, having greater toughness than in the case of the alloy contained in the welding rod, can be obtained as desired. Further objects of my invention will appear from the detailed description of the same hereinafter.

For example, I may provide welding rods containing 15 to 25% by weight of chromium, 1 to 3% by weight of silicon and 1 to 6% by weight of carbon, the remainder being comprised substantially entirely of iron. The alloy containing even this high chromium content has great toughness, probably due to the absence of any uncombined graphitic carbon. When the carbon is 2% or higher, probably all of the chromium is in the form of a chromium carbide, which is extraordinarily hard, but when the carbon is below 2% some of the chromium appears to be not in the form of a carbide, so that the properties of the alloy are materially changed accordingly. The alloys of which the rods are comprised may be produced in accordance with the process as set forth in my copending application entitled Process of making chromium iron alloys and product thereof, filed March 5, 1942, Serial No. 433,445, or in any other available way. The alloy referred to is, accordingly, melted by heating to any desired temperature, as for example 2500 to 3000° F., but preferably 2800° F., and cast in molds made of any desired material, such as cast iron, sand, etc., so as to form the alloy into rods having, for example, a diameter of ¼" and a length of 12".

The welding rods thus obtained are used in welding in connection with any known type of welding operation, as for example with the aid of an oxy-acetylene blow torch at a temperature such as 2500° F. or higher, or any electrical welding process at said temperature, as for instance to produce a welded surface on steel surfaces, such as in tipping the prongs of power shovels or providing a wear surface on steel plows. It is found that no flux whatever is necessary in applying the surface in this way. In the process of applying the alloy surface to the steel, this may be any known steel but, for example, may be a mild steel containing about $\frac{1}{10}$% by weight of carbon. In this way, it is found that the amount of carbon remaining in the surface can be appreciably decreased down to 2 to 6% by weight as compared to the 6% by weight, or down to 1 to 1½% by weight as compared to the 2%, of carbon in the welding rods used in the surfacing operation. The surface thus produced on the steel is silvery white and extremely hard, the hardness being greater with the increase of the carbon content and the toughness being greater the smaller the carbon content. Also, both in the case of the welding rods as well as in the case of the surfaces produced as above on the steel by welding, the material is of extraordinary hardness and very difficult to grind except with a diamond wheel.

It is to be understood also that a small amount, up to a total of ½%, in any one of the above alloys may be comprised of any one or more of the following:

molybdenum
tungsten
manganese which may be present therein as impurities.

While I have described my invention above in detail I wish it to be understood that many changes may be made therein without departing from the spirit of the same.

I claim:

1. A welding rod comprising 15 to 25% by weight of chromium, 1 to 3% by weight of silicon and 1 to 6% by weight of carbon, the balance being substantially comprised of iron any other constituent being not more than ½% of the whole by weight.

2. A welding rod comprising 15 to 25% by weight of chromium, 1 to 3% by weight of silicon and 1 to 6% by weight of carbon, the balance being substantially comprised of iron any other constituent being not more than ½% of the whole by weight, said alloy having a hardness such that it is very difficult to grind it except with a diamond wheel.

JOSEPH J. VETTER.